(12) United States Patent
Ueda

(10) Patent No.: US 7,705,657 B2
(45) Date of Patent: *Apr. 27, 2010

(54) BACKFLOW PREVENTING CIRCUIT CAPABLE OF PREVENTING REVERSE CURRENT EFFICIENTLY

(75) Inventor: Yuuichi Ueda, Ikeda (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/177,451

(22) Filed: Jul. 22, 2008

(65) Prior Publication Data

US 2008/0285191 A1    Nov. 20, 2008

Related U.S. Application Data

(63) Continuation of application No. 11/636,308, filed on Dec. 7, 2006, now Pat. No. 7,423,471.

(30) Foreign Application Priority Data

Dec. 9, 2005     (JP) ............................. 2005-355809

(51) Int. Cl.
*H03K 17/687* (2006.01)
(52) U.S. Cl. .................. 327/427; 327/374; 327/376; 327/377; 327/309
(58) Field of Classification Search ......... 327/427–437, 327/374–377, 108–112
See application file for complete search history.

(56) References Cited

U.S. PATENT DOCUMENTS 6,225,857 B1 *    5/2001    Brokaw ..................... 327/540

6,400,209 B1 *    6/2002    Matsuyama et al. ......... 327/534

FOREIGN PATENT DOCUMENTS

| JP | 58-144234   | 8/1983 |
|----|-------------|--------|
| JP | 10-240359   | 9/1998 |
| JP | 11-186503   | 7/1999 |
| JP | 2000-201429 | 7/2000 |
| JP | 3210567     | 7/2000 |
| JP | 2002-152968 | 5/2002 |
| JP | 2002-152978 | 5/2002 |
| JP | 3329168     | 7/2002 |
| JP | 2003-258614 | 9/2003 |
| JP | 2005-151677 | 6/2005 |

* cited by examiner

*Primary Examiner*—Lincoln Donovan
*Assistant Examiner*—Brandon S Cole
(74) *Attorney, Agent, or Firm*—Cooper & Dunham LLP

(57) ABSTRACT

This patent specification describes a backflow prevention circuit which includes a first switch configured to conduct or to shut down a current path from an input terminal to an output terminal, a logic circuit configured to binarize an input voltage at the input terminal based on an output voltage at the output terminal and to output a binary signal and a shutdown circuit configured to cause the first switch to shut down independently of a switching control signal in accordance with the binary signal output from the logic circuit. The switching control signal performs a switching control of the first switch. The logic circuit outputs a shutdown signal to shut down independently of the switching control signal when the input voltage becomes smaller than the output voltage.

13 Claims, 4 Drawing Sheets

BACKFLOW PREVENTING CIRCUIT CAPABLE OF PREVENTING REVERSE CURRENT EFFICIENTLY

CROSS-REFERENCE TO RELATED APPLICATION

This application is a Rule 1.53(b) continuation of application Ser. No. 11/636,308, filed Dec. 7, 2006, now U.S. Pat. No. 7,423,471 the entire contents of which are incorporated by reference herein.

TECHNICAL FIELD

The present disclosure relates to a backflow prevention circuit, and more particularly to a backflow prevention circuit capable of preventing reverse current efficiently.

BACKGROUND

Recently, a variety of electric equipments such as a mobile phone, a personal computer, an electric home appliance, and so on, has been widely developed. It has been studied to make such electric equipment more compact, to have higher functional capability and lower power consumption. The electric equipment commonly includes a switching circuit between a power supply and a load to have a margin of safety.

Further, the electric equipment may include more complex circuit which may need a multiple power supplying system in order for the electric equipment to have a high performance. The multiple power supplying system supplies multiple voltages and a variety of power capacities. Namely, it has become more important to control the multiple power supplying system by switching each power supply so as to obtain a safe equipment having a low power consumption, and avoid faulty operation.

Thus, a switching circuit is generally employed to protect electric equipment from damages due to overheat and protect a power supply, such as battery, etc., from a reverse current flowing from a load to the power supply. It is desirable for the switching circuit to have less power consumption, because the switching circuit is an auxiliary circuit for the electric equipment. Such a switching circuit is called a backflow prevention circuit.

FIG. 1 illustrates an example of a conventional backflow prevention circuit 100. The backflow prevention circuit 100 includes a MOS (metal oxide semiconductor) switch 103, a diode 109 and a gate drive circuit 110. The diode 109 and the MOS switch 103 are connected in series between a power supply 107 and a load 108.

When a voltage of the power supply 107 at an input terminal IN is larger than a voltage of a cathode of the diode 109 at an output terminal OUT, a current flows through the diode 109 because a forward voltage is applied on the diode 109. Meanwhile, when the voltage of the cathode of the diode 109 at the output terminal OUT is larger than the voltage of power supply 107 at the input terminal IN, the current through the diode 109 is restricted and may be a small reverse current which is defined by a current-to-voltage characteristic of the diode 109.

In the backflow prevention circuit 100 of FIG. 1, however, there is a power loss at the diode 109 due to the forward current of the diode 109. Further, a resistance between the power supply 107 and the load 108 is increased due to a resistance of the diode 109 in addition to a resistance of the MOS switch 103.

FIG. 2 illustrates another example of the conventional backflow prevention circuit 200. The backflow prevention circuit 200 includes a MOS switch 113, a comparator 111, a bias voltage source 112 and a gate drive circuit 120. The bias voltage source 112 is employed to improve a noise margin of the backflow prevention circuit 200 and is connected between the power supply 107 and an inverted-input terminal of the comparator 111. The MOS switch 113 is formed of a P-MOS (p-channel metal oxide semiconductor) transistor. A voltage of the bias voltage source 112 is set to be smaller than the voltage of the power supply 107.

The comparator 111 compares voltages between an output voltage at the output terminal OUT and the voltage of the power supply 107 at the input terminal IN. When the output voltage becomes lower than a predetermined voltage Vc, the comparator 111 outputs a high level signal to a gate of the P-MOS transistor (MOS switch 113) so as to fix the MOS switch 113 to be off. The predetermined voltage Vc is defined by the following formula:

$$Vc = Vp - Vb$$

where Vp is the voltage of the power supply 107 and Vb is the bias voltage source 112. Thus, a reverse current is prevented by setting the MOS switch 113 to be in shutdown state. The MOS switch 113 is off in a shutdown state.

In the backflow prevention circuit 200 of FIG. 2, however, minimum voltage for the operation is relatively high because the comparator 111 may be formed of a differential amplifier which requires a larger voltage from the power supply to operate. Further, there may be a penalty in power consumption because the differential amplifier may include a constant current source which generates current constantly. Moreover, an operational voltage range may be narrower in comparison to other backflow prevention circuits, because an input voltage for the comparator 111 is restricted to be within a narrower voltage range.

Furthermore, a full voltage range from the power supply voltage to ground voltage may be needed to be input to the comparator 111 of FIG. 2. Therefore, it may be necessary to employ so called Rail-to-Rail input circuit at an input part of the differential amplifier. The so called Rail-to-Rail outputs almost full voltage range from the power supply voltage to ground to the differential amplifier.

However, such input circuit may require approximately twice more circuit elements in comparison to conventional input circuit of the differential amplifier. As a result, the backflow prevention circuit 200 may be a large circuit in size and may have a larger power consumption in comparison with other backflow prevention circuits.

SUMMARY

This patent specification describes a novel backflow prevention circuit which, in a preferred embodiment, includes a first switch configured to conduct or to shut down a current path from an input terminal to an output terminal, a logic circuit configured to binarize an input voltage at the input terminal based on an output voltage at the output terminal, and output a binary signal, and a shutdown circuit configured to cause the first switch to shut down independently of a switching control signal in accordance with the binary signal output from the logic circuit. The switching control signal is used to perform switching control of the first switch. The logic circuit outputs a shutdown signal to shut down independently of the switching control signal when the input voltage becomes smaller than the output voltage.

According to another exemplary embodiment of this patent specification, the novel backflow prevention circuit further includes a pull-down resistor configured to form a pull-down connection so as to increase a margin of the backflow prevention circuit.

In another exemplary embodiment of this patent specification, the novel backflow prevention circuit further includes a second switch configured to perform switching in accordance with the binary signal of the logic circuit, a current-limit resistor connected between a substrate gate of the first switch and the output terminal, and a third switch connected between the substrate gate of the first switch and ground and configured to perform switching at equal timing to the switching of the second switch in accordance with the binary signal of the logic circuit. The first switch can be formed of N-channel MOS transistor and the shutdown circuit is connected between a gate of the N-channel MOS transistor and ground.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
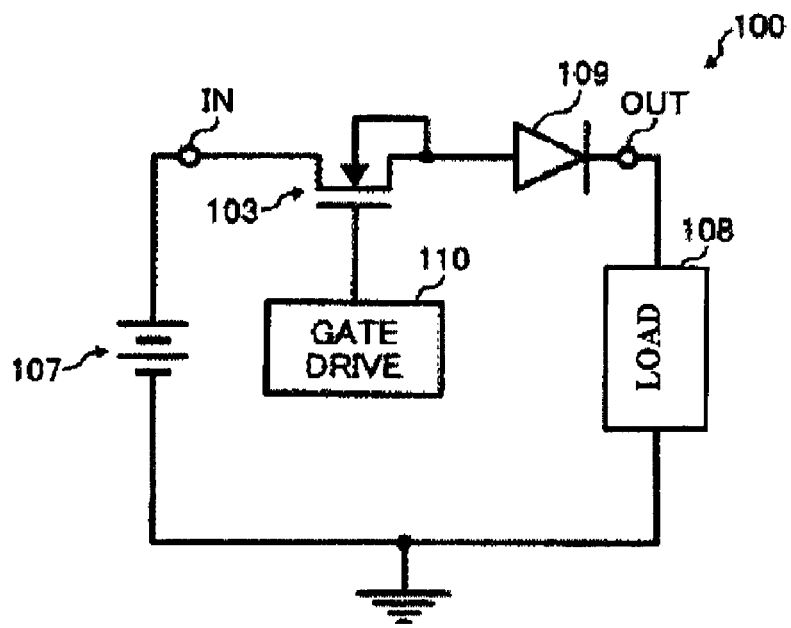
FIG. 1 illustrates a conventional backflow prevention circuit.
Figure 2:
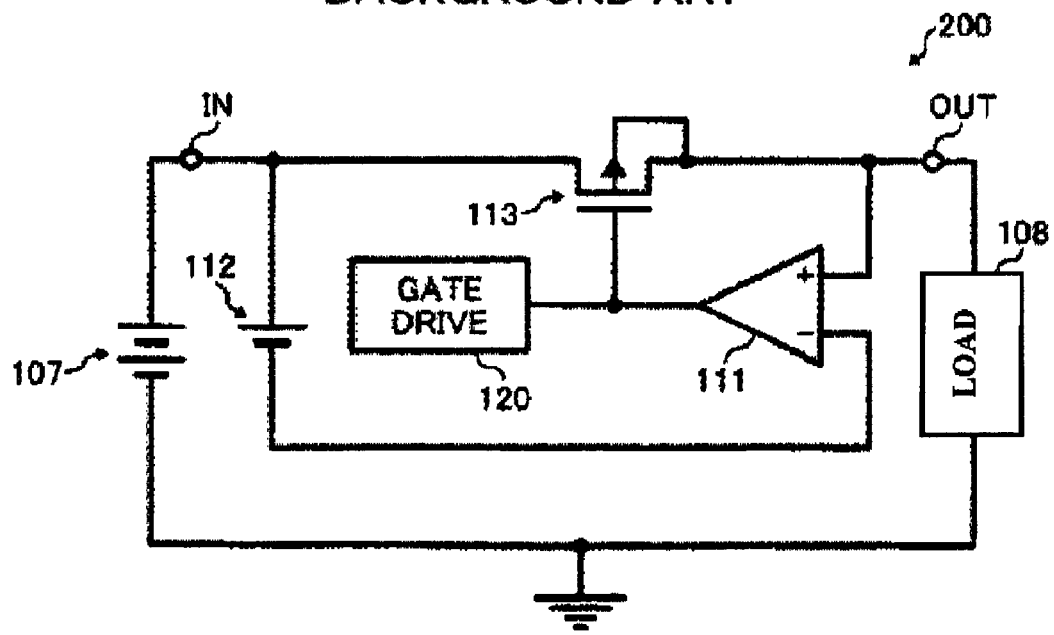
FIG. 2 illustrates another conventional backflow prevention circuit.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 3, a backflow prevention circuit according to exemplary embodiments are described.

Figure 3:
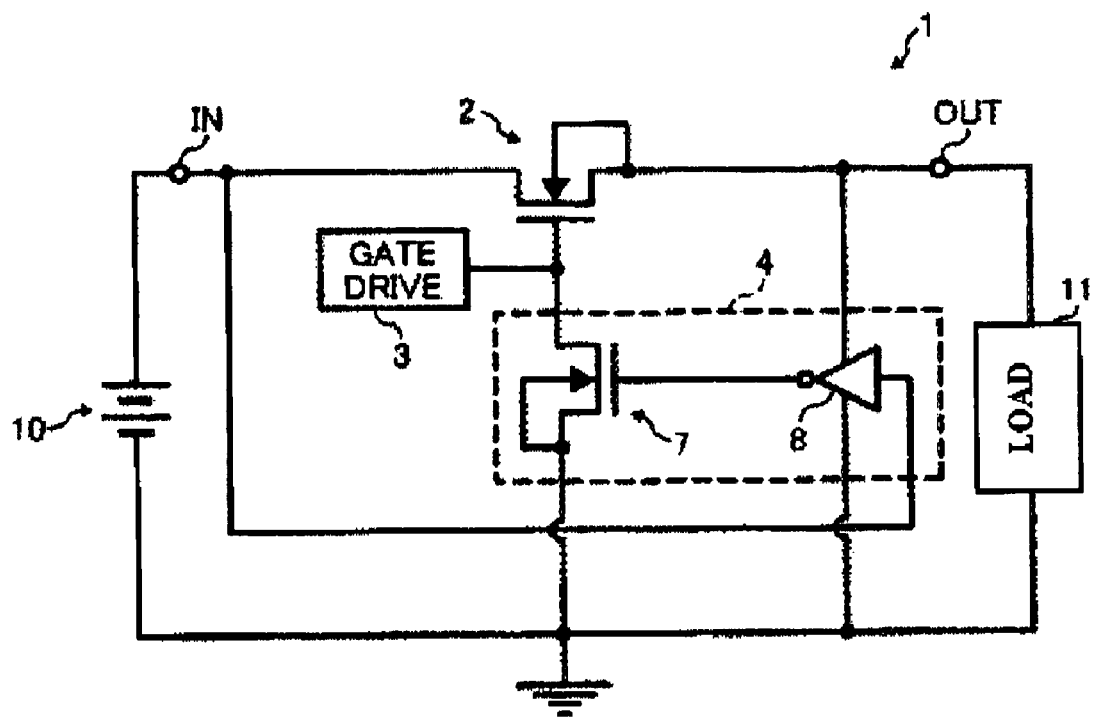
FIG. 3 illustrates a backflow prevention circuit according to an exemplary embodiment of the present disclosure.

FIG. 3 illustrates a backflow prevention circuit 1 according to a first exemplary embodiment of the present disclosure. The backflow prevention circuit 1 is a switching circuit and connects a DC power supply 10 to a load 11. The DC power supply 10 is wired to an input terminal IN and the load 11 is wired to an output terminal OUT of the backflow prevention circuit 1.

The backflow prevention circuit 1 includes a MOS switch 2, a gate drive circuit 3 and a backflow prevention control circuit 4. The MOS switch 2 is formed of N-MOS (n-channel metal oxide semiconductor) transistor. The gate drive circuit 3 supplies a driving voltage to make the MOS switch 2 on and off. The backflow prevention control circuit 4 is to prevent a backflow current from flowing back from the load 11 to the DC power supply 10. The backflow prevention control circuit 4 is formed of the N-MOS transistor 7 and an inverter 8.

The MOS switch 2 performs as a first switch. The N-MOS transistor 7 performs as a second switch and forms a shutdown circuit. The inverter 8 forms a logic circuit. The backflow prevention control circuit 4 is a control circuit to prevent the backflow current from flowing back from the output terminal OUT to the input terminal IN, when the output voltage becomes larger than the input voltage.

The MOS switch 2 is connected between the input terminal IN and the output terminal OUT. A substrate gate of the MOS switch 2 is wired to the output terminal OUT. The N-MOS transistor 7 is connected between a gate of the MOS switch 2 and ground.

As for the inverter 8, an input terminal of the inverter 8 is wired to the input terminal IN and an output terminal of the inverter 8 is wired to a gate of the N-MOS transistor 7. A power to the inverter 8 is supplied from the output terminal OUT. A substrate gate of the N-MOS transistor 7 is wired to ground. The inverter 8 may be formed of a variety of combinations such as a P-MOS transistor and a resistor, a N-MOS transistor and a resistor, NMOS and PMOS transistors, etc.

Figure 4:
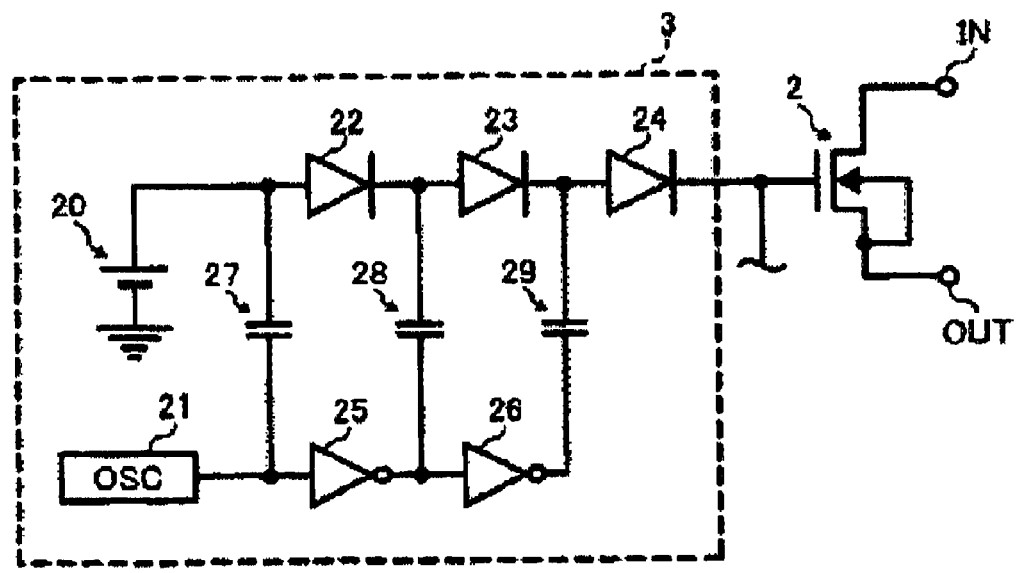
FIG. 4 illustrates a gate drive circuit of the backflow prevention circuit of FIG. 3.

The gate drive circuit 3 may be formed of a charge pump circuit as shown in FIG. 4. Referring to FIG. 4, the gate drive circuit 3 includes a power source 20, an oscillator 21, diodes 22 to 24, invertors 25 and 26 and capacitors 27 to 29. The power source 20 supplies a predetermined voltage. The oscillator 21 generates a predetermined rectangular wave.

A plus terminal of the power source 20 is wired to an anode of the diode 22 and a terminal of the capacitor 27. Another terminal of the capacitor 27 is wired to an output terminal of the oscillator 21 and an input terminal of the inverter 25. A cathode of the diode 22 is wired to an anode of the diode 23 and a terminal of the capacitor 28. An output terminal of the inverter 25 is wired to another terminal of the capacitor 28 and an input terminal of the inverter 26.

Similarly, a cathode of the diode 23 is wired to an anode of the diode 24 and a terminal of the capacitor 29. An output terminal of the inverter 26 is wired to another terminal of the capacitor 29. A cathode of the diode 24 is an output terminal of the gate drive circuit 3 and is wired to the gate of the MOS switch 2.

With this circuit configuration, when the output voltage becomes larger than the input voltage, the inverter 8 outputs a high level signal to the gate of the N-MOS transistor 7 so as to make the N-MOS transistor 7 to be on. When the N-MOS transistor 7 is on, the gate of the MOS switch 2 is grounded so that the MOS switch 2 is to be off. Thus, the backflow prevention circuit 1 is set to be in shutdown state independently of the operation of the gate drive circuit 3. Thus, the backflow prevention control circuit 4 controls to prevent the backflow current from flowing back from the output terminal OUT to the input terminal IN.

When the MOS switch 2 is stopped to operate, a reverse current through the N-MOS transistor 7 is relatively very small. Furthermore, even while the MOS switch 2 is being operated, only a very small leakage current is flowing from the gate drive circuit 3. Since the gate drive circuit 3 is formed of, for example, the charge pump circuit of FIG. 4, there may be no output current of the gate drive circuit 3 except a very small leakage current to the gate of the MOS switch 2.

By the backflow prevention circuit 1 according to the first exemplary embodiment, a power saving is achieved without additional power loss to a power loss due to the current flow from the input terminal IN to the output terminal OUT at a forward bias. Further, the backflow prevention control circuit 4 is simple and is just formed of one inverter and one N-MOS transistor. Therefore, it is easily integrated into an IC (integrated circuit) and a necessary area for the backflow prevention control circuit 4 may be relatively small in the IC.

Figure 5:
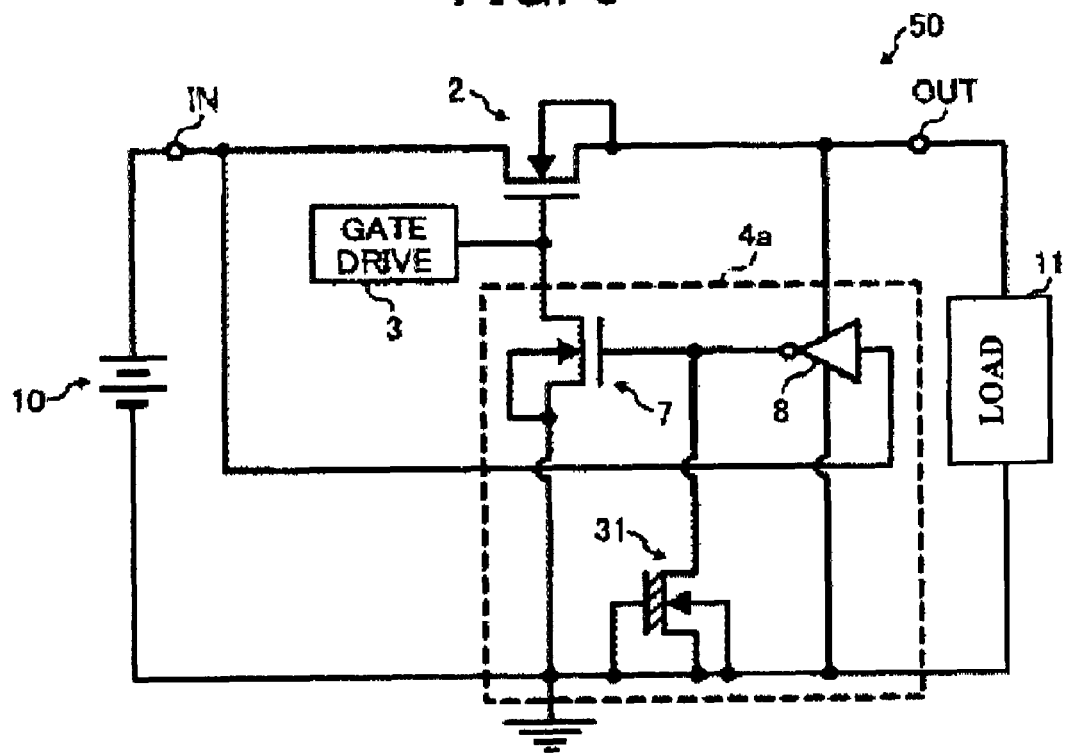
FIG. 5 illustrates an example of a backflow prevention circuit according to a second exemplary embodiment of the present disclosure.

FIG. 5 illustrates a backflow prevention circuit 50 according to the second exemplary embodiment of the present disclosure. In a second exemplary embodiment, a depression MOS transistor is introduced to the backflow prevention control circuit 1 of FIG. 3. Namely, only difference from the first exemplary embodiment is that the depression NMOS transistor 31 is introduced.

Similar to the first exemplary embodiment, the backflow prevention circuit 50 includes the MOS switch 2, the gate drive circuit 3 and a backflow prevention control circuit 4a. The MOS switch 2 is formed of N-MOS transistor. The gate drive circuit 3 supplies a gate voltage to cause the MOS switch 2 on and off.

The backflow prevention control circuit 4a is a control circuit to prevent a backflow current from flowing back from the load 11 to the DC power supply 10. The backflow prevention control circuit 4a is formed of the N-MOS transistor 7, an inverter 8 and the depression NMOS transistor 31.

The depression NMOS transistor 31 is connected between the output terminal of the inverter 8 and ground. A gate and a substrate gate of the depression NMOS transistor 31 is wired to ground to work as a constant current source. The depression MOS transistor works as a pull-down resistance to fix the output voltage of the inverter 8 to be ground voltage.

The depression NMOS transistor 31 improves a noise margin of the backflow prevention circuit 50 so as to avoid a following false operation.

When the output voltage is dropped slightly, the supply power voltage of the inverter 8 is also decreased because the power is supplied to the inverter 8 from the output terminal. By the decrease of the supply power voltage of the inverter 8, an input voltage range, which allows the inverter 8 to output a low level signal in response to a predetermined input voltage range, is changed and becomes narrower.

The inverter 8 may output an almost equal voltage to the output voltage of the output terminal OUT to the gate of the N-MOS transistor 7, in accordance with a slight drop of the input voltage at the input terminal IN. As a result, the N-MOS transistor 7 may be turned on.

By the backflow prevention circuit 50 according to the second embodiment, however, it is possible to avoid an occurrence of such faulty operation by fixing the output voltage of the inverter 8 to be ground voltage.

Figure 6:
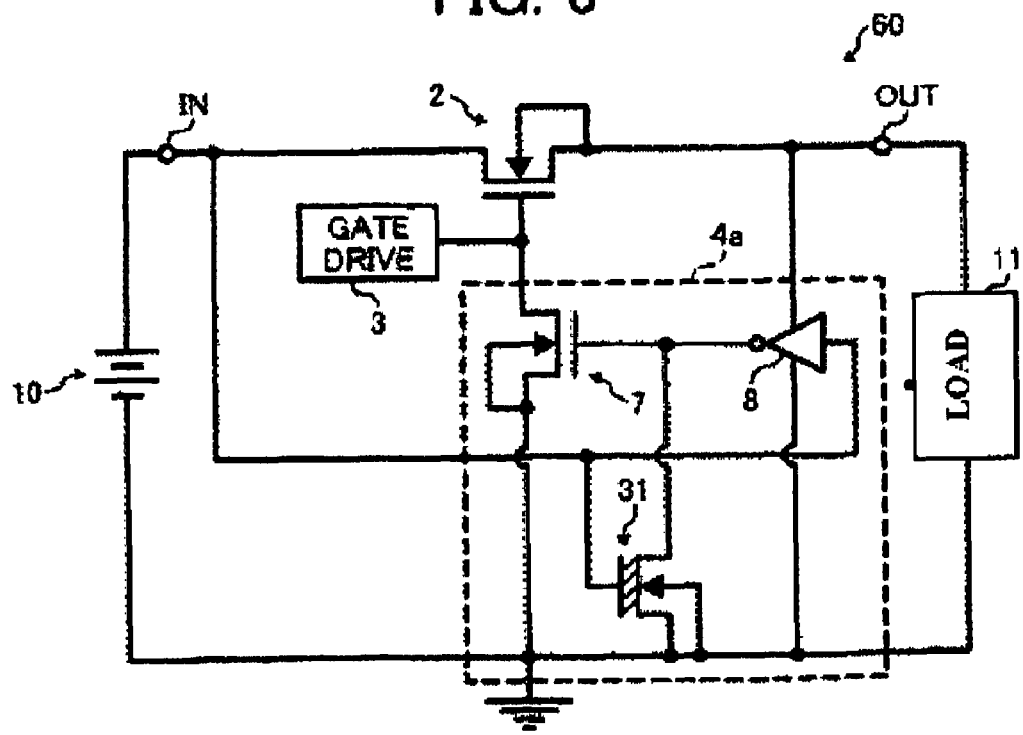
FIG. 6 illustrates another example of a backflow prevention circuit according to the second exemplary embodiment of the present disclosure.

FIG. 6 illustrates another example of a backflow prevention circuit according to the second exemplary embodiment of the present disclosure. The backflow prevention circuit 60 of FIG. 6 is different from the backflow prevention circuit 50 of FIG. 5 only in that a gate of the depression NMOS transistor 31 is wired to the input terminal IN. The backflow prevention circuit 60 can obtain a similar effect as the backflow prevention circuit 50 of the FIG. 5.

Thus, the depression NMOS transistor 31 is employed and is connected between the output terminal of the inverter 8 and ground to improve the noise margin of the backflow prevention circuits 50 and 60 in the second exemplary embodiment.

In a switching circuits using MOS transistor switch, a substrate bias effect of MOS transistor is to be considered. The substrate bias effect may increase the threshold voltage of the MOS switch and affect the switching performance of the MOS transistor switch.

In the switch circuit in which a MOS switch is provided between input and output terminals and a substrate gate of the MOS switch is wired to ground, when high voltage is input to the input terminal IN and the MOS switch is to be on, the threshold voltage of the MOS switch is increased due to the substrate bias effect of MOS transistor. When the threshold voltage of the MOS switch is increased, a resistance at on-state of the MOS switch is increased.

In the first and second exemplary embodiments, the substrate gate of the MOS switch 2 is wired to the output terminal to avoid the substrate bias effect.

However, there may be a possibility of an occurrence of a forward bias at a reverse current condition in which the output voltage is larger than the input voltage. If the output voltage is higher than a voltage at the substrate gate of the MOS switch 2 at the reverse current condition, a large current may flow due to the forward bias which may be formed between the output terminal OUT and the substrate gate of the MOS switch 2.

In a third exemplary embodiment, a N-MOS transistor 35 and a resistor 36 are added to the backflow prevention circuit of FIG. 5 to avoid such forward bias condition by applying ground voltage to the substrate gate of the MOS switch 2 at the reverse current condition.

Figure 7:
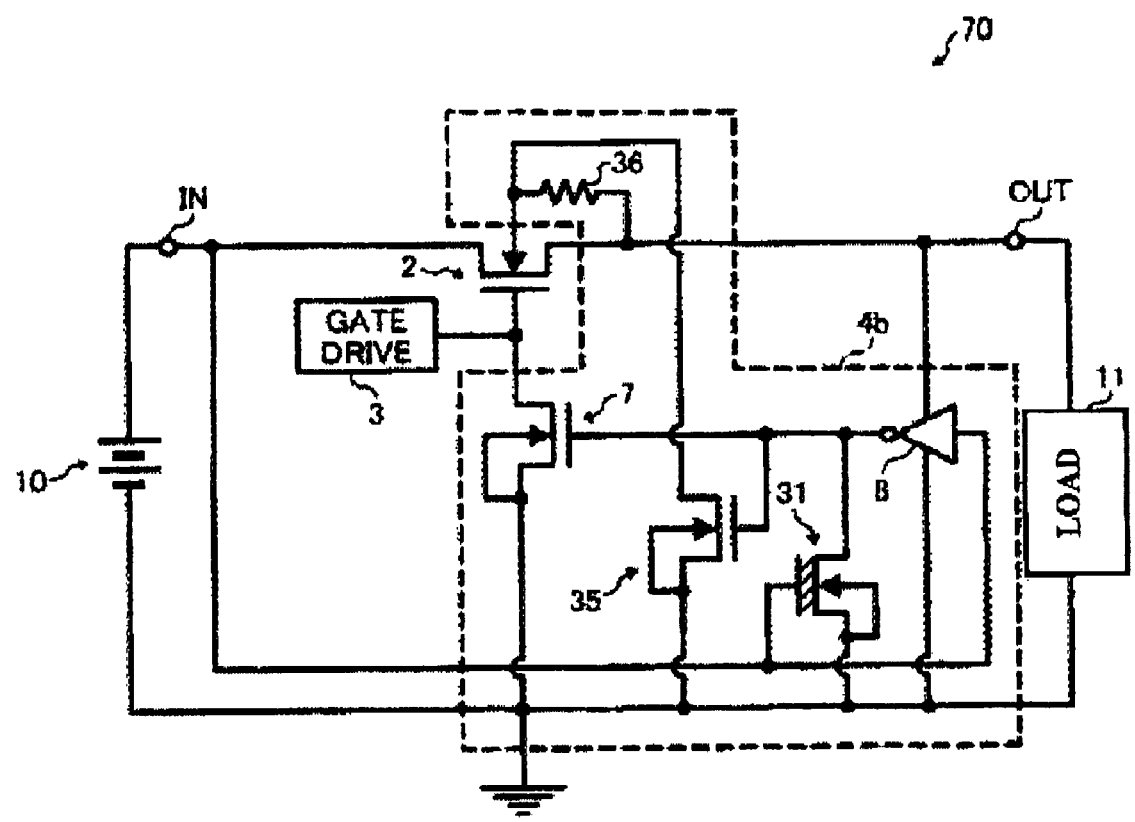
FIG. 7 illustrates a backflow prevention circuit according to a third exemplary embodiment of the present disclosure.

FIG. 7 illustrates a backflow prevention circuit 70 according to the third exemplary embodiment of the present disclosure. The backflow prevention circuit 70 includes the MOS switch 2, the gate drive circuit 3 and a backflow prevention control circuit 4b. The MOS switch 2 is formed of N-MOS transistor. The gate drive circuit 3 supplies a gate voltage to cause the MOS switch 2 on and off.

The backflow prevention control circuit 4b is a control circuit to prevent a backflow current from flowing back from the load 11 to the DC power supply 10. The backflow prevention control circuit 4b is formed of N-MOS transistors 7 and 35, the inverter 8, the depression NMOS transistor 31 and a resistor 36.

The N-MOS transistor 35 and the resistor 36 are connected in series between the output terminal OUT and ground. The connecting node of the N-MOS transistor 35 and the resistor 36 is wired to the substrate gate of the switch 2. The N-MOS transistor 35 forms a third switch. As for the N-MOS transistor 35, a gate of the N-MOS transistor 35 is wired to the output terminal of the inverter 8. The substrate gate of the N-MOS transistor 35 is wired to ground.

With this circuit configuration, when the output voltage becomes larger than the input voltage, the inverter 8 outputs a high level signal to the gate of the N-MOS transistor 7. The N-MOS transistors 7 and 35 are to be on at same time. Then, the substrate gate of the MOS switch 2 is grounded. As a result, a backflow current is avoided by setting the MOS switch 2 to be off and in shutdown state.

Thus, in the backflow prevention circuit 70 according to the third exemplary embodiment, the N-MOS transistor 35 is connected between the substrate gate of the MOS switch 2 and ground. The substrate gate of the MOS switch 2 is connected to the output terminal through the resistor 36.

It is possible to avoid the reverse current by setting the MOS switch 2 to be off and in shutdown state. Further, it is possible to avoid the occurrence of a leakage current of the MOS switch 2 due to the forward bias at the reverse current condition, in addition to obtaining similar benefits as the second exemplary embodiment.

The resistor 36 limits a current through the N-MOS transistor 35. A power consumption capacity of the resistor 36 is determined to allow a predetermined current from the output terminal OUT to ground at the reverse current condition.

The backflow prevention circuit 70 according to the third exemplary embodiment is a modification of the backflow prevention circuit of FIG. 5. However, the concept of this disclosure is also applicable to other backflow prevention circuits such as the backflow prevention circuits of FIG. 3, FIG. 6 and etc.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application No. 2005-355809 filed on Dec. 9, 2005 in the Japan Patent Office, the entire contents of which are incorporated by reference herein.

What is claimed is:

1. A method of controlling a backflow prevention circuit, comprising the steps of:
    conducting a current path from an input terminal to an output terminal by turning on a first switch in accordance with a switching control signal;
    shutting down the current path from the input terminal to the output terminal by turning off the first switch in accordance with the switching control signal; and
    binarizing an input voltage at the input terminal based on an output voltage at the output terminal
    outputting a binary signal,
    wherein the first switch is shut down in accordance with the binary signal independently of the switching control signal when the input voltage becomes smaller than the output voltage.

2. The method of claim 1, further comprising connecting a power supply to a load through said backflow prevention circuit.

3. The method of claim 2, further comprising connecting said power supply to said input terminal and connecting said load to said output terminal.

4. The method of claim 1, further comprising preventing flow of a backflow current from said output terminal to said input terminal, by operation of said backflow prevention circuit.

5. A mobile phone including a backflow prevention circuit configured to prevent flow of a reverse current from a load In the mobile phone to a power supply of the mobile phone, said backflow prevention circuit comprising:
    an input terminal and an output terminal
    a first switch configured to conduct or shut down a current path from said input terminal to said output terminal;
    a logic circuit configured to binarize an input voltage at the input terminal based on an output voltage at the output terminal, and output a binary signal; and
    a shutdown circuit configured to cause the first switch to shut down independently of a switching control signal in accordance with the binary signal output from the logic circuit the switching control signal being used for switching control of the first switch,
    wherein the logic circuit outputs a shutdown signal to shut down the current path independently of the switching control signal when the input voltage becomes smaller than the output voltage.

6. The mobile phone of claim 5, wherein said backflow prevention circuit connects said power supply to said load.

7. The mobile phone of claim 5, wherein said input terminal of said backflow prevention circuit is coupled to said power supply and said output terminal of said backflow prevention circuit is coupled to said load.

8. The mobile phone of claim 5, wherein said backflow prevention circuit prevents flow of a backflow current from said output terminal to said input terminal.

9. Electronic equipment comprising:
    a power supply;
    a load consuming at least part of power supplied by said power supply; and
    a backflow prevention circuit configured to prevent flow of a reverse current from said load to said power supply, said backflow prevention circuit comprising:
        a first switch configured to conduct or shut down a current path from an input terminal to an output terminal;
        a logic circuit configured to binarize an input voltage at the input terminal based on an output voltage at the output terminal, and output a binary signal; and
        a shutdown circuit configured to cause the first switch to shut down independently of a switching control signal in accordance with the binary signal output from to logic circuit, the switching control signal being used for switching control of to first switch,
    wherein the logic circuit outputs a shutdown signal to shut down the current path independently of to switching control signal when to input voltage becomes smaller than to output voltage.

10. The electronic equipment of claim 9, wherein said backflow prevention circuit connects paid power supply to said load.

11. The electronic equipment of claim 9, wherein said input terminal is coupled to said power supply and said output terminal is coupled to said load.

12. The electronic equipment of claim 9, wherein said backflow prevention circuit prevents flow of a backflow current from said output terminal to said input terminal.

13. The electronic equipment of claim 9, wherein said electronic equipment includes a computer and said backflow prevention circuit is included in said computer.

* * * * *